April 30, 1957 E. R. KOLENDA 2,790,583
ROTATABLE VALVE FOR CONTAINERS
Filed Jan. 11, 1952 2 Sheets-Sheet 1
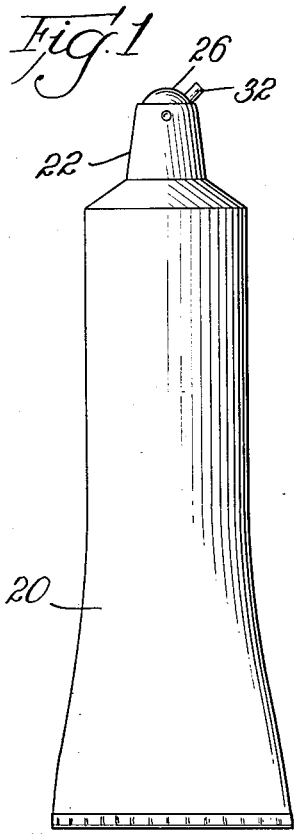
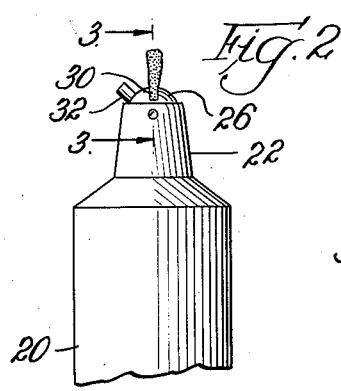
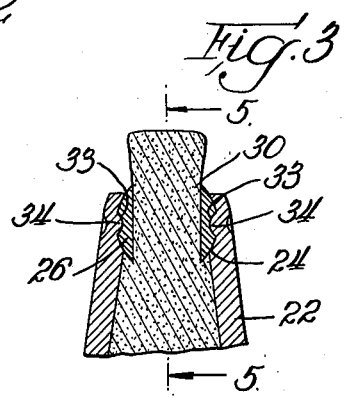
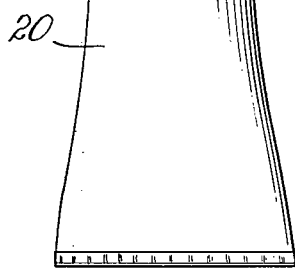
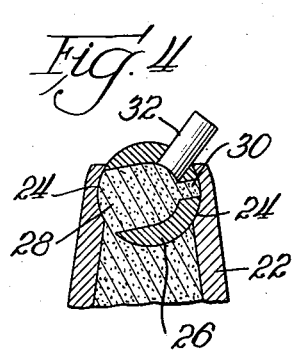
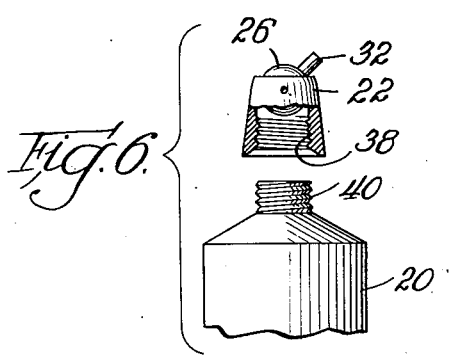
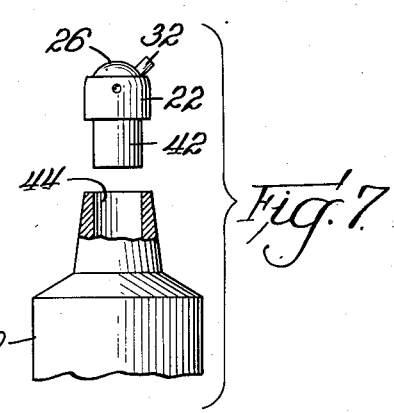
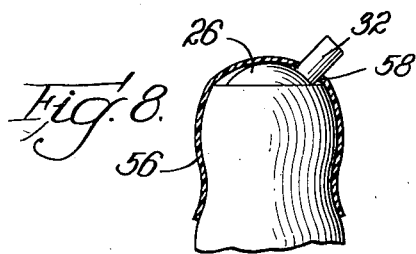
INVENTOR.
Edward R. Kolenda
BY
Mann, Brown and Hantmann
Attys.

April 30, 1957 E. R. KOLENDA 2,790,583
ROTATABLE VALVE FOR CONTAINERS
Filed Jan. 11, 1952 2 Sheets-Sheet 2
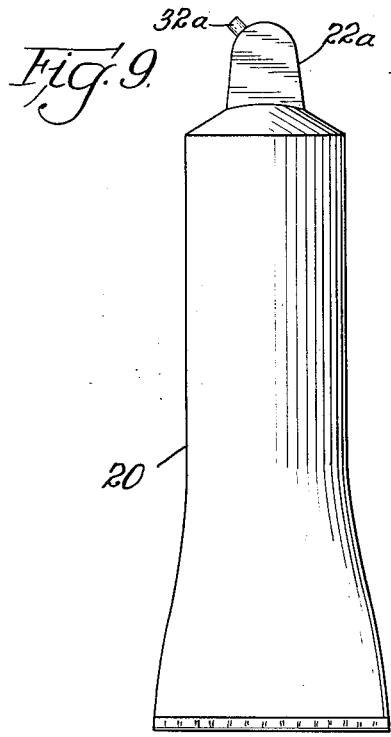
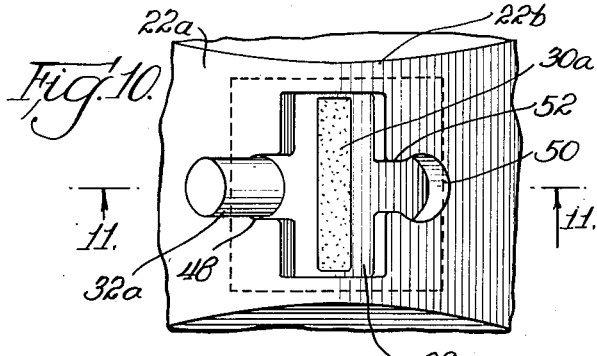
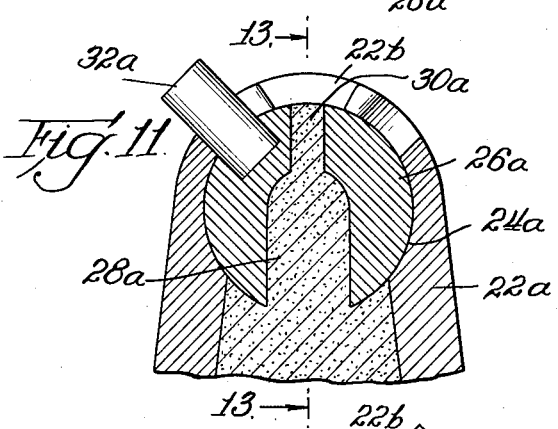
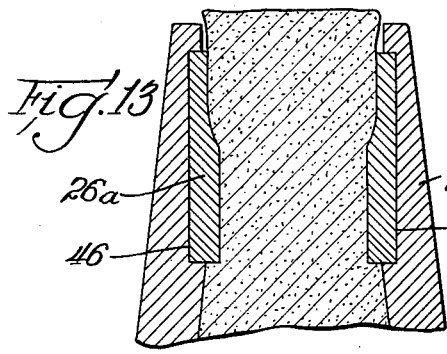
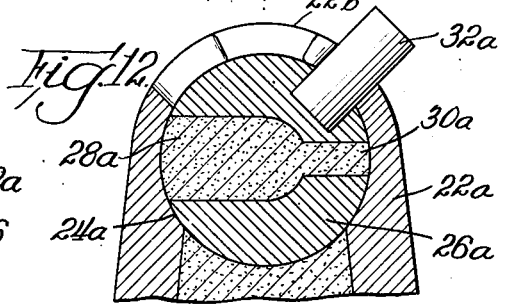
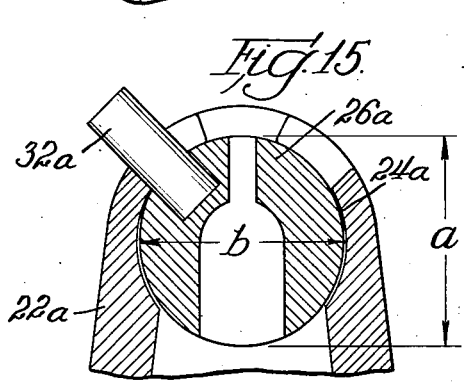
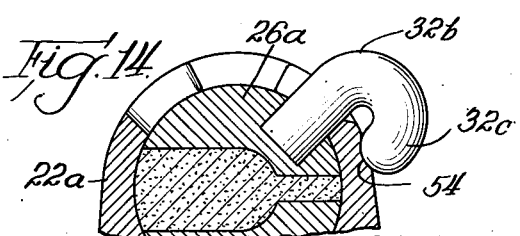
INVENTOR.
Edward R. Kolenda
BY
Mann, Brown and Hansman
Attys.

United States Patent Office 2,790,583
Patented Apr. 30, 1957

2,790,583

ROTATABLE VALVE FOR CONTAINERS

Edward R. Kolenda, Oaklawn, Ill.

Application January 11, 1952, Serial No. 265,941

4 Claims. (Cl. 222—554)

My invention relates to a rotatable valve for containers used in packaging powders, pastes, liquids and like substances. The invention is particularly adaptable to collapsible tubes of the kind used in packing paste products, such as tooth paste, shaving cream, hand lotion, paste shampoo, and paint pigments.

These collapsible tubes are generally designed to permit the contents thereof to be ejected in desired quantities and to permit sealing the remaining contents from the atmosphere. For this purpose such tubes generally contain a threaded neck portion for cooperation with a threaded cap. In use the cap is removed when it is desired to expel some of the contents from the tube, and when the desired amount of the contents is obtained the remainder is sealed from the atmosphere by screwing the cap on the threaded neck portion of the tube. In use the conventional screw-threaded cap presents many difficulties. The great majority of tubes of paste material are used in the bathroom or kitchen and usually used under conditions such that the hands of the user are wet and slippery. Thus, in removing or replacing the cap there is a likelihood that it will be dropped and become lost, leaving the contents remaining in the tube exposed to the atmosphere. When such a tube is replaced without the cap the contents of the tube near the neck portion becomes dry and hard, and it is then difficult to squeeze any of the contents out of the neck portion. Another difficulty present in the use of containers with the conventional caps is that the normal removal and replacement of the cap requires the utilization of both hands of the user. A further difficulty encountered in the use of the conventional collapsible tube with the threaded neck portion and cooperating screw-threaded cap is that frequently an amount of paste in excess of that required is squeezed out of the tube and remains projecting out above the top of the neck portion. Generally, this paste is not removed before replacing the cap, and upon such replacement the paste is forced down along the threads on the neck and frequently oozes out around the bottom of the cap presenting a messy appearance and an unsanitary condition. When this paste becomes hardened on the threads it makes the removal and replacement of the cap difficult.

My invention seeks to overcome these difficulties and it is, therefore, one of the objects of my invention to provide a valve for containers such as collapsible tubes which in use does not require the removal of a cap, but which permits access to the contents of the container by a manual rotation of a valve element.

Another object of my invention is to provide a liquid or paste container valve which may be moved from open to closed position by the same hand which holds the container.

A further object of my invention is to provide a valve which, when it is moved from open to closed position, cuts off any of the material projecting above the valve and retains such excess portion in a position where it may be easily and conveniently removed.

A still further object of my invention is to provide a container valve which is neat in appearance and easy to clean.

A still further object of my invention is to provide a dispenser valve which may be secured in closed position and thus prevent leaking upon filling, packaging or transportation.

A still further object of my invention is to provide a dispenser valve for liquids, paste, or the like, which is inexpensive to manufacture, convenient to use, and which may be made of either metal or plastic.

These and other objects and advantages will appear from the following description and drawings, in which:

Figure 1 is a drawing of a collapsible tube having a valve housing formed integral therewith and showing the valve in closed position;

Figure 2 shows a portion of the tube of Figure 1 with the valve in open position, and with a portion of the contents of the tube being ejected through the valve;

Figure 3 is a cross-section through the valve and housing taken along the lines 3—3 of Figure 2;

Figure 4 is a cross-section through the valve and housing showing the valve in closed position;

Figure 5 is a cross-section taken along the lines 5—5 of Figure 3 showing the valve in open position;

Figure 6 shows a form of my invention in which the valve housing is provided with an interior screw-threaded portion for use on conventional tubes having threaded neck portions;

Figure 7 shows a modification of my invention in which the valve housing is adapted for a press fit engagement with the interior of an annular neck portion of a tube;

Figure 8 shows a modification of my invention in which the valve housing is provided with an annular recess to accommodate a perforated cap which locks the valve in closed position;

Figure 9 shows a conventional tube with an integral valve housing, but in which the valve is of cylindrical form as distinguished from the generally spherical form shown in Figures 1 through 5 inclusive;

Figure 10 is a top view of the valve and housing of Figure 9, and showing in addition a recess to lock the valve in closed position;

Figure 11 is a cross-section of the valve of Figure 9 taken along the lines 11—11 of Figure 10 and showing the valve in open position;

Figure 12 is a view similar to Figure 11 but showing the valve rotated to closed position;

Figure 13 is a cross-section taken along the lines 13—13 of Figure 11 showing the valve in open position and carried by bearing surfaces in the housing;

Figure 14 is another modification of my invention showing means for locking the valve in closed position; and Figure 15 is still another modification of my invention showing in cross-section an oval-shaped valve for rotation in a partially cylindrical bearing surface to retain the valve normally in closed position.

The valve of my invention may be applied to any type of container from which it is desired to have individually selected amounts of liquids, pastes, powders, or the like, removed. For convenience, I have chosen to illustrate herein my valve as applied to a collapsible tube which may be made of metal or plastic. This tube is generally indicated as 20. In Figures 1 and 2 a valve housing 22 is shown as being the conventional annular neck portion of the tube and formed integral therewith. This valve housing may be formed either of metal or plastic and the upper internal part is formed to constitute a concavely spherical bearing surface 24. Positioned partially within the valve housing 22 is a valve member 26 which may be made of metal or plastic and which is adapted for partial rotation in the bearing surface 24. The valve member 26, as shown in Figures 1 through 7, is generally of a spherical shape, and of a size to fit snugly within the bearing surface 24, and has a lower passage 28 communicating with a slotted upper passage 30. The valve member 26 carries a stud 32 projecting outwardly therefrom to permit manual rotation of the valve member and in cooperation with the side of the housing 22 to limit movement of the valve member. In order to provide an axis of rotation the valve member 26 has concavely spherical recesses 33 on opposite sides thereof for cooperation with convexly spherical projections 34 carried by the housing 22. These projections 34 may be formed by deforming a portion of the material of housing 22.

Assuming that the valve 26 is in closed position, as shown in Figures 1 and 4, and the tube from which the paste or other like material is to be ejected is held in the hand of the user, the valve, by means of the stud 32, may be readily rotated about its axis of rotation with one of the fingers of the same hand of the user which is holding the tube. No particular care is required to determine the maximum extent of rotation since the stud may be moved until it rests against the opposite side of the housing. The passages 28 and 30 through the valve member 26 are so located that when the stud is at rest against one side of the housing, as shown in Figure 4, these passages and the contents of the tube are sealed from the atmosphere. When the stud 32 is rotated to place the valve in open position it is moved until it abuts against the opposite side of the housing 22, as shown in Figure 5, and in such position the contents of the tube may be ejected through the passages 28 and 30. To close the valve it is merely necessary to rotate the valve by means of the stud until it abuts against the opposite side of the housing 22. The size relationship between the concavely spherical bearing surface and the generally spherical valve is such that the valve rotates snugly therein leaving insufficient space for the contents of the tube to be ejected between the valve and the bearing surface.

If, upon use of the tube, there is an excess amount of material projecting upwardly from the passage 30, upon movement of the valve to closed position the excess amount of material will be cut off at the outer extremity of the passage 30 by the side of the housing 22 and retained in this position where it may be readily removed to permit storing of the tube in clean condition until it is again required for use.

There are many ways in which such a valve as described in Figures 1 through 5 may be assembled. If made of plastic, the housing may be moulded in two complemental pieces, and the valve 26 may be moulded as a unit. Upon insertion of the valve in place within the two halves of the housing 22 these halves may then be bonded to form a unitary housing structure. If a valve and valve housing of this type is to be made of metal, the valve 26 may be cast or fabricated by machine operations from metal balls, and the stud 32 may be secured therein. The housing 22 may be initially formed including a portion of the bearing surface 24, but with the upper portion of the housing flared outwardly to receive the valve 26. Upon insertion of the valve the upper portion of the housing may be bent inwardly to retain the valve, and the housing may be crimped to provide the projections 34 forming the axis of rotation in cooperation with the recesses 32. With the structure of Figures 1 to 5 inclusive it is also feasible to have the housing fabricated of metal with a plastic valve, or to have a metal valve in a plastic housing.

In Figure 6 there is shown the valve and housing of Figures 1 to 5 inclusive but in a form for use with conventional containers having screw-threaded necks. This form has internal threads 38 for cooperation with the external threads 40 on the neck of a container. The valve in this form may be made independently of the container to which it is to be applied and may be sold either with the container or for use with conventional containers now on the market.

In Figure 7 there is shown the valve and housing generally similar to that disclosed in Figures 1 to 5 inclusive, but in a form adapted for a press fit into the neck of a container. In this form the lower part 42 of the housing 22 is of reduced diameter to be pressed tightly into the annular recess 44 of a container. The valve and housing of Figure 7 may be made independently of the container and assembled as desired.

Figures 9 to 13 show further modifications of my invention in that in these figures, among other things, the valve member is of a generally cylindrical shape as distinguished from the spherical contour of the valves of Figures 1 through 5. Figure 9 shows a container 20, again in the form of a collapsible tube, with a housing 22a which may be integral with the tube as described in connection with the structure of Figure 1. The valve shown in Figures 9 through 13 may also be adapted for use with conventional containers having screw-threaded neck portions, similar to the structure of Figure 6, or for a press fit engagement with the tube, similar to the structure of Figure 7.

The valve housing of Figures 9 through 13 may be made of metal or plastic and has side and end portions respectively inclined slightly toward each other. These side and end portions terminate in an upper portion 22b which is hemicylindrical in shape to accommodate the cylindrical valve 26a. The interior of the upper end of the housing is cylindrical in shape and of a size substantially equal to the size of the valve 26a to provide a bearing surface 24a in which the valve may be partially rotated. The space between the valve 26a and the bearing surface 24a is sufficient to permit ready rotation of the valve within the bearing surface, but not sufficient to permit the passage therethrough of any of the contents of the container. The end walls of the housing 22a are recessed to provide annular bearing surfaces 46 in which the cylindrical valve rotates. These annular bearing surfaces fix the axis of rotation of the valve 26a. This valve 26a has throughout a portion of its length a lower passage 28a and an upper passage 30a in communication with each other and forming a continuous passage through the valve. In the open position of the valve the lower passage 28a is in communication with the contents of the container, and the upper passage 30a is exposed to the atmosphere. In closed position both passages are contained within the bearing surface 24a. The valve 26a is provided with a stud 32a extending upwardly therefrom to permit ready rotation thereof from open to closed position. The upper portion 22b of the housing 22a may be cut away as shown in dotted lines in Figure 9 to expose a portion of the valve 26a in which structure the side walls of this opening serve as abutments against which the stud 32 abuts to limit the extent of rotation of the valve. The operation of the cylindrical valve unit of Figures 9 through 13 is similar to that of the valve of Figures 1 through 5 in that this valve may be rotated from the closed position shown in Figure 12 to the open position of Figure 11. This opening and closing of the valve may be accomplished by one of the fingers of the hand holding the container.

In the closed position, as shown in Figure 12, the contents of the container are sealed from the atmosphere and prevented from being ejected from the container since the passages through the valve are contained within the cylindrical bearing surface in which the valve rotates. When the valve is rotated to open position, as shown in Figure 11, the passages through the valve permit the contents of the container to be ejected through the valve to the atmosphere. Similar to the structure described in Figures 1 through 5 inclusive, the valve and housing may be made of metal or plastic and different materials may be used for each element. Likewise, these parts may be made and assembled in any conventional manner.

Referring specifically to containers of the collapsible tube type it is customary to fill such containers from the bottom end of the tube after the neck opening has been sealed by having the screw-threaded cap put in place. After the tubes are filled the bottom edges of the tube are folded over and crimped to prevent leakage. In order to fill tubes having valves of the type described herein in this manner it is desirable to provide means in connection with such valves to releasably hold the valve in closed position. It is also desirable to provide such means for holding the valve in closed position to prevent accidental ejection of the contents of the container during handling, packaging, shipment, and after delivery of the packaged product to the ultimate consumer. For these reasons, it is also desirable to provide means to hold the valves described herein in closed position.

In Figure 10 there is shown in full lines the upper portions 22b of the housing extending substantially wholly over the cylindrical valve 26a. This housing is provided at one side with a recess 48 for receiving the stud 32a when the valve is rotated to open position. On the opposite side of the housing is a recess 50, the neck portion 52 of which is slightly smaller than the diameter of the stud 32a. In this structure when the valve is rotated to closed position the stud 32a will come in contact with the slightly smaller opening defined by the neck portion 52 of the recess 50, and by the application of additional pressure the stud may be forced through this neck portion into the recess 50 wherein it will be held, thus preventing accidental opening of the valve. In this construction it is contemplated that the material from which the stud 32a and the neck portions 52 will be made is such that there will be sufficient resiliency or deformability to permit these parts to be deformed slightly by the application of manual pressure, thus enabling the stud to be received into the recess 50 but restraining the release of the stud from the recess without the application of such pressure.

In Figure 14 there is shown an additional structure designed to retain the valve in closed position. In this figure the valve 26a is illustrated in closed position within the valve housing 22a. The valve is provided with a stud 32b projecting upwardly and outwardly from the valve. Formed integrally with this stud is a hook portion 32c adapted to be releasably received and held in a recess 54 in the housing 22a when the valve is rotated to closed position. The hook portion 32c of the stud is of such length that when the stud is rotated about the axis of rotation of the valve approaching the closed position, the lower part of the hook portion will abut against the side of the housing 22a. Upon the application of manual force in the direction of the rotation of the valve, due to the resiliency between the side of the housing and the hook portion of the stud, the end of the hook portion will ride up and over the side of he housing and be received into the recess 54. In order to move the valve out of its closed position sufficient force must be exerted to again move the hook portion out of the recess and over the housing.

In Figure 15 I have shown another method of retaining the valve in closed position. In this figure there is shown the housing 22a, and the valve 26a with the stud 32a. In this modification the valve 26a is of a slightly oval shape with the diameter a through the valve being greater than the diameter b. Since the bearing surface defines an arc of a circle the diameter of which is slightly larger than the diameter b, but smaller than the diameter a, the valve 26a when rotated toward closed position within the bearing surface will tend to bind as it reaches closed position. The combination of the exertion of additional force together with the general resiliency of the material from which these parts are made will result in a snug valve closure resisting accidental opening of the valve.

It is, of course, obvious that the locking means of Figures 10, 14 and 15 are equally adaptable to and useful with the valve shown in Figures 1 through 7.

In Figure 8 I have shown another method of holding the valve in closed position. In this figure there is shown the valve 26 of Figures 1 through 5 having a stud 32. The valve housing 22 may be provided with a narrow neck portion to receive a cap 56. The lower end of this cap 56 is of a reduced diameter compared with the remaining portions of the cap, such reduced diameter cooperating with the recessed portion of the housing to hold the cap in place once it has been inserted over the housing. The cap 56 is a unitary structure made of metal foil, plastic, or other manually frangible substance and is adapted to cover the whole of the upper portion of the housing and valve. The cap 56 contains an orifice 58 slightly larger in diameter than the diameter of the stud 32. In assembly, the valve is moved to closed position and the cap 56 is pressed in place over the valve and valve housing with the stud 32 projecting through the orifice 58. Movement of the valve to open position is prevented by the cap 56 and such movement cannot be accomplished until the cap has been removed. This cap, being of frangible material, may be manually removed, as by tearing, upon ultimate delivery to the consumer. It is of course obvious that the holding or locking means shown in Figure 8 is adaptable and equally useful with the other forms of valves described herein.

Having thus described my invention, what is claimed as new and desired to be secured by Letters Patent is:

1. A valve for a container holding liquid, powder, or plastic materials to be discharged from said container, said valve comprising a housing adapted at its lower end for communication with the interior of said container, a cylindrical bearing surface located interiorly at the upper end of said housing, a cylinder rotatable in said bearing surface, a cylindrical stud carried by said cylinder projecting upwardly of said housing for rotation of said cylinder, means fixing a single axis of rotation of said cylinder, said cylinder having a passage therethrough perpendicular to the axis of rotation of said cylinder adapted upon rotation thereof selectively to permit and prevent discharge of the material held by said container, and means to hold said cylinder in a closed position, said means comprising a circular recess at one side of said housing having a neck portion of a width slightly less than the diameter of said stud.

2. A valve for a container holding liquid, powder, or plastic materials to be discharged therefrom and comprising a housing formed with an aperture and providing a concave interior bearing surface, a valve element having convex contours rotatable in said bearing surface about a single axis of rotation through said housing, and a stud having a resiliently deformable locking portion carried by said valve element and projecting through said aperture for movement thereacross in a plane located normal to said axis for actuating said valve element, said valve element having a passage therethrough adapted upon rotation of said valve element selectively to establish communication between said container and said housing aperture to permit discharge through said passage of the material held by said container and to interrupt such communication and prevent such discharge, said housing having cooperating resiliently deformable locking means adjacent said aperture and disposed in the path of movement of said locking portion of said stud to normally block the accidental movement thereof to and from the position wherein such communication is interrupted and said locking portion and locking means being yieldable in response to manual pressure to permit movement of said stud to and from said last mentioned position.

3. A valve element as claimed in claim 2 wherein said housing provides a cylindrically shaped concave interior bearing surface and said valve element is cylindrically shaped such that the valve element is rotatable in said housing about a single axis of rotation.

4. A valve element as claimed in claim 3 wherein said locking portion of said stud is cylindrical and said housing is formed with a recess for accommodating said stud in said last mentioned position, said recess communicating with said aperture through a neck portion of a width slightly less than the diameter of said stud, said neck portion being defined by said cooperating locking means.

References Cited in the file of this patent
UNITED STATES PATENTS

| Number | Name | Date |
|---|---|---|
| 156,290 | Jackson | Oct. 27, 1874 |
| 1,630,555 | Witt | May 31, 1927 |
| 1,726,642 | Betts | Sept. 3, 1929 |
| 1,882,180 | Davidson et al. | Oct. 11, 1932 |
| 1,967,797 | White | July 24, 1934 |
| 2,005,029 | Field | June 18, 1935 |
| 2,014,066 | Flagg | Sept. 10, 1935 |
| 2,032,776 | Van Ness | Mar. 3, 1936 |
| 2,126,815 | Rest | Aug. 16, 1938 |
| 2,153,245 | Gansz | Apr. 4, 1939 |
| 2,209,050 | Church | July 23, 1940 |
| 2,547,116 | Gould | Apr. 3, 1951 |